United States Patent Office 2,901,514
Patented Aug. 25, 1959

2,901,514

ACYCLIC KETALS OF α,α'-DIFLUOROPERHALO-GENOKETONES AND THEIR PREPARATION

John J. Drysdale, Clifton Park Manor, Del., assignor to E. I. du Pont de Nemours and Company, Wilmington, Del., a corporation of Delaware No Drawing. Application May 3, 1956
Serial No. 582,328

11 Claims. (Cl. 260—615)

This invention relates to a new class of ketals and, more particularly, to the ketals of polyfluoroperhalogenoketones with monohydric compounds and a process for their preparation.

Ketals are recognized as useful organic intermediates and as solvents and plasticizers. The ketals in general are readily preparable by acid-catalyzed reactions between the requisite ketones and alcohols or orthoesters but generally exhibit extreme hydrolytic susceptibility with destruction of the ketal structure under acidic or neutral conditions.

This invention has as an object the preparation of new ketals. A further object is the preparation of new materials useful as transformer fluids, as fluids for high temperature power transmission or hydraulic systems, and for use in liquid coupled mechanical drives, and the like, where a particularly high degree of oxidative and hydrolytic stability is needed at elevated temperatures. Another object is the provision of a novel process whereby these ketals can be prepared. Other objects will appear hereinafter.

These objects are accomplished by the present invention of the ketals with monohydric organic compounds of wholly carbon chain polyfluoroperhalogenoketones wherein each of the carbons immediately linked to the ketone carbonyl carbon carries at least one fluorine atom, with the remaining substituents on both said carbons and on all carbons linked thereto being halogen preferably of atomic number from 9 to 35. The new ketals have the general formula

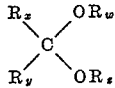

wherein $R_x$ and $R_y$, which can be alike or different or together joined, are perhalogenohydrocarbon radicals, i.e., are completely halogen substituted radicals, generally of no more than about seven carbons each and when together joined generally of from five to seven ring carbons, in which perhalogenohydrocarbon radicals the halogen is of atomic number and preferably 9 to 35, and in which the first or alpha carbon of each radical, i.e., the carbon directly and singly linked to the indicated ketal carbon, carries at least one fluorine substituent and $R_z$ and $R_w$, which can be alike or different, are discrete monovalent hydrocarbon radicals in each of which any substituent on nuclear aromatic carbon is halogen and any substituent on carbon aliphatic in character, i.e., aliphatic or cycloaliphatic, is fluorine, at least one of said radicals being joined to its ketal oxygen from carbon only singly bonded and therefore aliphatic in character. These monovalent radicals are generally of no more than about eighteen carbons each. Preferably $R_x$ and $R_y$ contain no more than six carbons each and total no more than seven carbons, $R_z$ and $R_w$ contain no more than twelve carbons each, and preferably contain a total of no more than eighteen carbons, and all the radicals are free of aliphatic unsaturation.

It will be noted that the formula of the compounds of this invention can also be written as

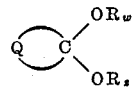

wherein $R_w$ and $R_z$ are as defined above and Q is merely the sum of $R_x$ and $R_y$, i.e. either two separate monovalent perhalogenohydrocarbon radicals of generally no more than seven carbons each or a single divalent perhalogenohydrocarbon radical which forms with the ketal carbon shown a wholly saturated ring of up to not more than six to eight carbons. In all cases, Q carries at least one fluorine on any carbon directly linked to the ketal carbon.

The new ketals of this invention have two valences of the ketal carbon singly bonded to discrete fluorine carrying carbons of at least one aliphatically saturated perhalogenohydrocarbon radical of valence of at most 2. The two remaining valences are bonded to discrete oxygen atoms in turn bonded to monovalent hydrocarbon radicals in each of which any substituent on aromatic carbon is halogen and any substituent on carbon aliphatic in character is fluorine, at least one of said monovalent radicals being bonded to its ketal oxygen from singly bonded carbon aliphatic in character.

The new ketals of this invention are surprisingly stable under a variety of conditions whereunder ketals ordinarily are unstable. Furthermore they are made under conditions opposite those ordinarily used for the preparation of ketals. Conventional ketal-forming reactions involving acidic catalysis failed. Surprisingly, the ketal-forming condensation between the requisite α,α'-difluoroperhalogenoketone and the acyclic ketal-forming alcohols and esters must be carried out under basic conditions.

In the process of the present invention a perhalogeno-α,α'-polyfluoroketone is reacted with a monohydric alcohol wherein any substituent on carbon aliphatic in character is fluorine and on carbon aromatic in character is halogen, an ester of a strong acid and a monohydric compound wherein any substituent other than the one ester group is halogen and this is fluorine when on carbon aliphatic in character, and a strong inorganic base.

The following examples in which parts are by weight are illustrative of the invention.

Example I

To a solution of 25 parts of sym.-dichlorotetrafluoroacetone in 40 parts of methanol was added with stirring under anhydrous conditions about 10 parts (about 20% excess based on the ketone) of dimethyl sulfate. About 13 parts (about 100% excess based on ketone) of solid sodium carbonate was then added with continued stirring in small portions over a period of five to ten minutes. Sufficient methanol was added from time to time to keep the reaction mixture mobile. After carbon dioxide evolution had ceased (five to ten minutes total reaction time), the reaction mixture was poured with stirring into 500 parts of water, and the organic layer was separated and dried over anhydrous magnesium sulfate. After purification by distillation, there was obtained about 16 parts (about 50% of theory) of the dimethylketal of sym.-dichlorotetrafluoroacetone (1,3 - dichloro - 1,1,3,3 - tetrafluoro-2,2-dimethoxypropane) as a clear, colorless liquid boiling at 150° C. at atmospheric pressure; $n_D^{25}$, 1.3830.

*Analysis.*—Calculated for $C_5H_6F_4Cl_2O_2$: C, 24.5%; H, 2.5%; F, 31.0%; Cl, 2.9%. Found: C, 24.5%; H, 4.0%; F, 30.4%; Cl, 27.6%.

Example II

To a stirred mixture of 25.0 parts of sym.-dichlorotetrafluoroacetone and 9.3 parts of sec.-butanol at 0° C. was added under anhydrous conditions 15.9 parts of dimethyl sulfate over a period of about ten minutes, and 15 parts of solid potassium carbonate was then added. The resulting reaction mixture was stirred for one hour, and about 15 parts of n-pentane was then added to facilitate stirring. After an additional one hour with stirring at room temperature, 150 parts of water was added, and the resulting mixture was extracted with two 35-part portions of n-pentane. The extracts were combined, dried over anhydrous magnesium sulfate, and the n-pentane solvent was removed by distillation. On further distillation there was obtained 14.3 parts (40% of theory) of the crude methyl sec.-butyl ketal of sym.-dichlorotetrafluoroacetone as a clear, colorless liquid boiling at 61–62° C. under a pressure corresponding to 13 mm. of mercury; $n_D^{25}$, 1.3910. The product was further purified by washing with aqueous 3 N sodium hydroxide solution followed by drying over anhydrous magnesium sulfate and redistillation. There was thus obtained 10 parts of the pure methyl sec.-butyl ketal of sym.-dichlorotetrafluoroacetone (1,3-dichloro-1,1,3,3-tetrafluoro-2-methoxy-2-sec.-butoxypropane) as a clear, colorless liquid boiling at 71.5° C. under a pressure corresponding to 14.5 mm. of mercury; $n_D^{25}$, 1.3949.

Analysis.—Calculated for $C_8H_{12}O_2Cl_2F_4$: C, 33.5%; H, 4.2%. Found: C, 32.5%; H, 4.2%.

*Example III*

To a mixture of 25 parts of sym.-dichlorotetrafluoroacetone and 5.8 parts of absolute ethanol at 0° C. was added under anhydrous conditions 15.9 parts of dimethyl sulfate with stirring over a period of about ten minutes. At the end of the addition, 15 parts of solid potassium carbonate was added in one portion, and the mixture was stirred under these conditions for one hour. About 20 parts of n-pentane was then added to improve mixing, and stirring was continued for an additional hour at room temperature, at which time 150 parts of water was added. The resulting mixture was extracted with two 35-part portions of n-pentane, and the extracts were combined, dried over anhydrous magnesium sulfate, and concentrated. Upon fractional distillation there was obtained 15.1 parts (46% of theory) of the methyl ethyl ketal of sym.-dichlorotetrafluoroacetone (1,3-dichloro-1,1,3,3-tetrafluoro-2-methoxy-2-ethoxypropane) as a clear, colorless liquid boiling at 79–80° C. under a pressure corresponding to 51 mm. of mercury; $n_D^{25}$, 1.3853.

Analysis.—Calculated for $C_6H_8O_2Cl_2F_4$: C, 27.8%; H, 3.1%; F, 29.3%. Found: C, 28.2%; H, 3.6%; F, 29.3%.

*Example IV*

To a mixture of 25 parts of sym.-dichlorotetrafluoroacetone and 25 parts of 2,2,3,3,4,4,4-heptafluoro-n-butanol at 0° C. was added 15.9 parts of dimethyl sulfate with stirring over a period of about five minutes under anhydrous conditions. At the end of the addition, 15 parts of solid potassium carbonate was added in one portion, and stirring was continued under these conditions for one hour. About 20 parts of n-pentane was then added to facilitate stirring, and the mixture was stirred for an additional hour at room temperature, after which 150 parts of water was added. The resulting mixture was extracted with two 35-part portions of n-pentane, and the extracts were combined, dried over anhydrous magnesium sulfate, and concentrated. From the residue there was thus obtained by fractional distillation 10 parts (about 20% of theory) of the methyl 2,2,3,3,4,4,4-heptafluoro-n-butylketal of sym.-dichlorotetrafluoroacetone (1,3-dichloro-1,1,3,3-tetrafluoro-2-methoxy-2-(2′,2′,3′,3′,4′,4′,4′-heptafluorobutoxy)propane) as a clear, colorless liquid boiling at 65–66° C. under a pressure corresponding to 17 mm. of mercury; $n_D^{25}$, 1.3384.

Analysis.—Calculated for $C_8H_5O_2Cl_2F_{11}$: C, 23.3%; H, 1.2%; F, 50.6%. Found: C, 22.2%; H, 1.4%; F, 52.3%.

*Example V*

To a mixture of 26.8 parts of sym.-dichlorotetrafluoroacetone, 9.2 parts of ethanol, 25 parts of anhydrous magnesium sulfate, 23.2 parts of freshly prepared silver oxide and about 200 parts of n-pentane, there was added with stirring over a period of one hour 28.4 parts of methyl iodide. After being stirred at room temperature for six hours, the yellow reaction mixture was filtered to remove the solid salts. The colorless filtrate was washed with three 100-part portions of water, dried over anhydrous magnesium sulfate, and concentrated. The residue was treated with a little 40% potassium hydroxide solution to remove traces of a carbonyl-containing impurity in the crude product. Upon distillation there was obtained 13.3 parts (25% of theory) of the pure methyl ethyl ketal of sym.-dichlorotetrafluoroacetone as a clear, colorless liquid boiling at 153–155° C. at atmospheric pressure; $n_D^{25}$, 1.3858—see Example III.

*Example VI*

To a mixture of six parts of bis(perfluoropropyl)-ketone, 35 parts of methanol, and six parts of dimethyl sulfate was added seven parts of powdered potassium carbonate with external ice/water bath cooling. After standing for two hours at room temperature carbon dioxide evolution had ceased and the reaction mixture was poured into 450 parts of water. The aqueous phase was extracted with three 70-part portions of diethyl ether and the extracts were combined, dried over anhydrous magnesium sulfate, and concentrated. There was thus obtained six parts (90% of theory) of the crude dimethyl ketal of bis(perfluoropropyl)ketone (4,4-dimethoxyperfluoroheptane). Upon distillation there was obtained 5.6 parts (85% of theory) of the pure ketal as a clear, colorless, pleasant smelling oil boiling at 71–72° C. under a pressure corresponding to 48 mm. of mercury; $n_D^{25}$, 1.3105.

Analysis.—Calculated for $C_9H_6O_2F_{14}$: C, 26.2%; H, 1.5%; F, 64.5%. Found: C, 25.6%; H, 1.9%; F, 64.9%.

The present invention is generic to the ketals of wholly carbon chain α,α′-polyfluoroperhalogenoketones with monohydric compounds wherein all hydrogen replacements in a hydrocarbon, other than the one hydroxyl, are halogen and this is fluorine when on carbon aliphatic in character, with the radical of at least one of the two monohydric moieties required having its free valence stemming from only singly bonded carbon. Perhalogeno-α,α′-polyfluoroketones wholly aliphatic in character are preferred. The present invention is generic to α,α′-polyfluoroperhalogeno aliphatic ketones, e.g., sym.-tetrachlorodifluoroacetone, perfluoroethyl perfluoropropyl ketone, i.e., perfluorohexan-3-one, perfluoroacetone, i.e., bis(perfluoromethyl)-ketone, perfluoromethyl perfluoropropyl ketone, etc.; polyfluoroperhalogenoaliphatic/cycloaliphatic ketones, e.g., perfluorocyclohexyl perfluoromethyl ketone, etc.; polyfluoroperhalocycloaliphatic ketones, e.g., perfluorocyclopentanone, etc.

The new ketals of the present invention are prepared by the reaction between a polyfluoroperhalogenoketone, a monohydric alcohol and an ester of a monohydric organic compound, i.e., a monohydric alcohol or a phenol, with a strong, oxygen-containing acid of sulfur, organic or inorganic, and a strong inorganic base. The esters of monohydric alcohols with the strong hydrohalic acids may also be employed to prepare the novel ketals of the present invention. In those instances when such esters are used a silver salt must be present to effect the final ketal-forming reaction.

In the process of the present invention there may be employed any monohydric alcohol ROH where the hydroxyl is alcoholic and joined to only singly bonded carbon and R is hydrocarbon with any substituent, i.e., replacement for hydrogen, on nuclear carbon halogen and on carbon aliphatic in character fluroine. Thus, there can be employed in the process of this invention in the manner illustrated in the examples not only the alcohols of the examples but any alcohol as defined above including aliphatic alcohols, both saturated and unsaturated, e.g., stearyl alcohol, allyl alcohol, etc., and particularly the alkanols, especially the lower (1–4 carbon) alkanols; araliphatic alcohols, e.g., benzyl alcohol, p-chloro-benzylalcohol, etc.; cycloaliphatic-substituted aliphatic alcohols, e.g., cyclohexylmethyl alcohol, etc.; alkaromatic-substituted aliphatic alcohols, i.e., alkaraliphatic alcohols, e.g., p-tolylmethyl alcohol, i.e., p-tolylcarbinol, etc.; cycloaliphatic alcohols, e.g., cyclohexanol, etc.; fluorine-substituted aliphatic and cycloaliphatic alcohols, e.g., 2,2,2-trifluoroethyl alcohol, and the telomer alcohols from polyfluoroolefins, e.g., 1,1,13-trihydroperfluorotridecanol, etc.

Any ester of a strong acid wherein any substituent on the carbon skeleton of the ester is halogen when on nuclear carbon and fluorine when on aliphatic carbon may be employed to prepare the ketals of the present invention including esters of the aliphatic alcohols, both saturated and unsaturated, with the strong hydrohalic acids, e.g., methyl iodide, ethyl iodide, allyl bromide, etc.; the araliphatic alcohol esters of the hydrohalic acids, e.g., benzyl bromide, etc.; the aliphatic alcohol half-esters of the strong oxygen-containing sulfur acids, e.g., methyl hydrogen sulfate, the cycloaliphatic alcohol half-esters of the strong oxygen-containing sulfur acids, e.g., cyclohexyl hydrogen sulfate, etc.; the aliphatic alcohol esters of the strong oxygen-containing sulfur acids, e.g., ethyl p-toluenesulfonate, etc.; the aryl esters of the strong oxygen-containing sulfur acids, e.g., phenyl p-toluenesulfonate, etc.

The novel ketals of the present invention are prepared by direct condensation of the aforesaid polyfluoroperhalogenoketones and the necessary alcohols and strong acid esters in the presence of a strong inorganic base. The four reaction components can be used in substantially equimolar proportions. However, excesses of the latter three are generally used to facilitate reaction. The ester of the strong acid is generally not used in over 50% excess but the inorganic base can be present in amounts up to 100% excess or greater. The alcohol can be present in large excess and is frequently so used as a reaction medium, the excess portion thereof being simply an inert diluent. In some cases, if desired, excesses of the ketone can be used serving to remove any water formed during the reaction as the stable ketone hydrate.

The strong base can be present as such or in the form of a salt thereof wherein the anion, i.e., acid moiety, can be organic or inorganic, the only important criterion being that it be one of a weak acid, preferably weaker than the hemiketal of the polyfluoroperhalogenoketone, i.e., the $pK_a$ of the acid, whose anion is in the salt, must be greater than about 4. Thus, there may be employed in the process of the present invention and in the manner disclosed in the examples above, carbonates, bicarbonates, hydroxides, oxides, cyanides, acetates, benzoates, etc. The alkali metal and alkaline earth metal bases are preferred because of their readier availability and greater reaction efficiency when the ketal-forming alcohol derivative is an ester of a strong oxygen-containing acid. The most common of these are the lithium, sodium, potassium, magnesium, calcium, strontium, and barium carbonates, bicarbonates, hydroxides and oxides, and acetates. When the ketal-forming ester is an ester of a hydrohalic acid, the necessary base must be silver oxide or a silver salt, with the anion as above.

The reaction can be conducted in the presence or absence of an aqueous or wholly organic reaction medium. For reasons of increased yields, the reaction zone is preferably maintained under anhydrous conditions. In addition since a molecule of water is formed during the reaction it is advantageous to have present in the reaction zone a dehydrating agent, preferably an inert inorganic salt such as anhydrous magnesium sulfate, and the like. Because of the necessarily present inorganic basic salt or salt-forming derivative and the salt formed during the reaction an inert organic diluent is generally present or is added as the reaction proceeds in order to facilitate mixing of the various materials. Any inert liquid organic diluent can be used and, generally speaking, the most common are the normally liquid hydrocarbons and fluorohydrocarbons including the aliphatic and halogenated aliphatic compounds, e.g., the hexanes, the heptanes, the octanes, and the like; the various chlorinated aliphatic hydrocarbons, e.g., carbon tetrachloride, tetrachloroethylene, the chloropentanes, and the like; the aromatic and halogenated aromatic hydrocarbons such as benzene, toluene, the xylenes, chlorobenzene, and the like; the cycloaliphatic and halogenated cycloaliphatic hydrocarbons, e.g., cyclohexane, chlorocyclohexane, and the like; the hydrocarbon ethers, e.g., diethyl ether, the dibutyl ethers, and the like, as well as excesses of the alcohols as discussed before. The choice of the particular diluent is not at all critical, and will vary primarily with the reaction temperature found necessary. The use of excess of the reactant monohydric alcohol as the diluent is preferred.

The condensation is carried out at temperatures ranging from below 0° C. to generally no higher than 200° C., varying with the relative reactivity of the particular polyfluoroperhalogenoketone and the particular alcohol and ketal-forming derivative thereof being used. Thus, with the short-chain ketones, alcohols, and ketal-forming derivatives thereof having generally no more than a total of about six to eight carbons each the reaction will be carried out at temperatures from generally no lower than about −25° C. to about 50° C. Practically speaking, the reaction can be effected in most instances over the range 0–100° C.

The pressure at which the reaction is carried out is largely immaterial and will vary, as will be apparent to those skilled in the art, with the specific nature of the reactants and the operating temperature being used, i.e., temperature and pressure are interdependent variables apparent for each particular system. Thus, if a lower boiling reactant is used and a higher reaction temperature is desired, efficient condensing means must be supplied to insure retention of that reactant in the reaction zone, or, alternatively, the reaction must be carried out in a closed reactor under superatmospheric pressure.

After the initial condensation is effected, the precipitated inorganic salts can be removed from the reaction mixture by simple filtration, and the product can be isolated and purified by conventional procedures. A simple method of carrying out these same steps, particularly in those instances where a liquid organic diluent is used and the precipitated inorganic salts are water-soluble, is to treat the entire reaction mixture with an excess of water, whereby the salts dissolve in the aqueous layer and the organic material including the product remains in the organic layer. Simple separation of the latter, followed by distillation and/or crystallization generally affords the desired ketals directly in high purity.

By proceeding according to the procedure above set forth and exemplified there can be obtained the novel ketals of the present invention. Thus, the methyl stearyl ketal of sym.-dichlorotetrafluoroacetone is obtained from the ketone, stearyl alcohol, and methyl iodide; the allyl ethyl ketal of bisperfluoropropylketone is obtained from the ketone, allyl alcohol, and ethyl iodide; the benzyl cyclohexylmethyl ketal of perfluoroethyl perfluoropropyl ketone is obtained from the ketone, cyclohexylmethyl alcohol, and benzyl bromide; the methyl p-tolylmethyl ketal of hexafluoroacetone is obtained from the ketone, p-tolylmethyl alcohol, and methyl hydrogen sulfate; the dicyclohexyl ketal of perfluoromethyl perfluoropropyl ketone is obtained from the ketone, cyclohexanol, and cyclohexyl hydrogen sulfate; the ethyl 2,2,2-trifluoroethyl ketal of perfluorocyclohexyl perfluoromethyl ketone is obtained from the ketone, 2,2,2-trifluoroethyl alcohol, and ethyl p-toluenesulfonate; the phenyl 1,1,13-trihydroperfluorotridecyl ketal of perfluorocyclopentanone is obtained from the ketone, 1,1,13-trihydroperfluorotridecanol, and phenyl p-toluenesulfonate; etc.

The new acyclic ketals of this invention range from clear, colorless, pleasant-smelling liquids to low-melting solids, depending generally on the total number of carbons in the molecule. Generally speaking, those containing less than about 18 carbons, which are the most common, are clear, colorless, pleasantly fresh-smelling liquids, boiling normally from 100–300° C.

The new ketals of the present invention, i.e., ketals, with polyfluoroperhalogenoketones wherein both the carbons immediately linked to the carbonyl carbon carry at least one fluorine substituent, of monohydric wholly carbon chain organic compounds wherein any substituent on nuclear carbon is halogen and any substituent on carbon of aliphatic character is fluorine, are markedly different from previously known ketals, even including those of perhalogenoketones not containing the two necessary α,α'-fluorine substituents. The differences extend even to the possible modes of preparation of the ketals. Conventional routes to ketals, e.g., the direct interaction of an alcohol with a ketone or an orthoester with a ketone, using the conventional strong acid catalysts, such as hydrogen chloride, p-toluenesulfonic acid, and the like, do not result in the formation of the desired ketals. Thus, when sym.-dichlorotetrafluoroacetone is reacted with methanol in the presence of anhydrous hydrogen chloride or with ethyl orthoformate and ethanol in the presence of p-toluenesulfonic acid, according to the most general methods for preparing ketals (see methods 129 and 130, pages 261–264, Wagner and Zook, "Synthetic Organic Chemistry," Wiley, 1953) no isolable quantities of the dimethyl ketal were obtained. The only product isolated was the methyl hemiketal in the first reaction.

Conversely, when the ketalization method found necessary for the ketals of the present invention (i.e., ketalization under basic conditions as explained in detail in the foregoing and illustrated specifically in the examples) is applied to the superficially similar halogenoketones, even including the perhalogenoketones, wherein the carbons immediately linked to the carbonyl carbon are free of the necessary at least one fluorine substituent, no ketals or even hemiketals are obtained.

The new ketals of the present invention exhibit extreme chemical and physical stability and high hydrolytic stability. Conventional ketals are very sensitive to aqueous acid with ready hydrolysis to the starting aldehyde and alcohol. Thus, Wagner and Zook, supra, point out that the various acidic catalysts must be neutralized very carefully or otherwise removed before the necessary continuing aqueous workup, otherwise the ketals are not obtained. In surprising contrast, the present ketals show substantially no reaction with aqueous acids even at elevated temperatures. Thus, the acyclic ketal of Example I (the dimethyl ketal of sym.-dichlorotetrafluoroacetone), representative of this new class of ketals, was heated at the reflux for 24 hours in methanol containing 38% hydrochloric acid and was recovered unchanged. Similarly another sample of the dimethyl ketal of sym.-dichlorotetrafluoroacetone exhibiting a refractive index $n_D^{25}$ of 1.3830 was treated under the following conditions with no observable change and with the refractive indices of the treated samples after recovery, all being 1.3830, i.e., identical.

(a) eight molar sulfuric acid at 100° C. for 48 hours
(b) six molar nitric acid at 100° C. for 48 hours
(c) concentrated hydrochloric acid at 100° C. for 48 hours.

These new ketals are not only stable to acids but show no reaction with various metals, either in solvents or to the metal alone, including exposure at elevated temperatures.

The surprisingly great stability of the ketals of the present invention is linked to the requirement that each carbon directly linked to the ketal carbon bear at least one fluorine, i.e., the stability of these ketals is not only a function of fluorine content but also of the position of the fluorine substituents. Thus, 2-trifluoromethyl-1,3-dioxolane, i.e., the cyclic acetal of trifluoroacetaldehyde, was obtained readily as a clear, colorless liquid boiling at 91.5–92° C. at atmospheric pressure and exhibiting a $n_D^{25}$ of 1.3365 by the condensation of trifluoroacetaldehyde hydrate with ethylene chlorohydrin in the presence of magnesium sulfate, followed by treatment with anhydrous solid potassium carbonate. This prior art compound has only one fluorine-substituted carbon bonded directly to the carbon carrying the ketal oxygens. In contrast to the behavior exhibited by the ketals of the present invention, hydrolysis of this material with methanolic hydrogen chloride resulted in complete destruction of the compound, presumably to the aldehyde or aldehyde hydrate and the ethylene chlorohydrin.

The new ketals of this invention exhibit not only surprisingly high hydrolytic stability but also outstanding resistance against thermal and oxidative degradation and are in fact non-flammable. Furthermore, they possess sufficiently high boiling points so as to make them of utility in certain so-called "stable liquid" outlets, e.g., as transformer fluids, as fluids for high temperature power transmission or hydraulic systems, and for use in liquid coupled mechanical drives, and the like, where a particularly high degree of oxidative and hydrolytic stability is needed at elevated temperatures.

Thus, the dimethylketal of sym.-dichlorotetrafluoroacetone of Example I, a representative member of the class of acyclic ketals of this invention, was heated at the reflux at atmospheric pressure (150° C.) for 140 hours with a stream of air being bubbled through the boiling liquid. At the end of this time, substantially no change was noted in the liquid ketal. There was recovered 98% of the starting ketal. The initial sample of the ketal exhibited a refractive index at 25° C. of 1.3830 and the recovered material exhibited a substantially identical value 1.3838.

The terms "strong acid," "strong base," "weak acid," are used in their common meaning as set forth for example in Pauling—"General Chemistry" (2d edition, Freeman, San Francisco, 1953), pp. 441, 455 and the term "alcohol radical" as used in the Patent Office sense as set forth in Classification Manual 200.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows.

I claim:

1. A ketal of the formula

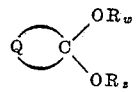

wherein (1) Q is at least one radical taken in sufficient number to satisfy the two free valences of the ketal carbon and is selected from the group consisting of monovalent and divalent perhalogenohydrocarbon radicals of up to 7 carbons and in which any multiple bonds are aromatic, each radical containing at least one fluorine on any carbon alpha to the ketal carbon, with the proviso that, when Q is divalent, it forms with the ketal carbon a wholly-saturated ring of not more than 6–8 carbons, and (2) $R_z$ and $R_w$ are monovalent 1–18 carbon radicals, in which any multiple bonds are aromatic, selected from the class consisting of hydrocarbon and halohydrocarbon, any halogen on nonaromatic carbon being fluorine, at least one of said $R_z$ and $R_w$ being bonded to its ketal oxygen by carbon possessing only single bonds.

2. 1,3-dichloro-1,1,3,3-tetrafluoro - 2,2 - dialkoxypropanes.

3. 1,3-dichloro-1,1,3,3-tetrafluoro - 2,2 - diloweralkoxypropanes.

4. 1,3-dichloro-1,1,3,3-tetrafluoro - 2,2 - dimethoxypropane.

5. 1,3-dichloro-1,1,3,3-tetrafluoro - 2 - methoxy-2-sec.-butoxypropane.

6. 4,4-dimethoxyperfluoroheptane.

7. The process for the preparation of ketals which comprises reacting, in the presence of a strong inorganic base, (A) an $\alpha,\alpha'$-polyfluoroperhalogenoketone of up to 15 carbons in which any multiple bonds are aromatic with (B) another compound in which any multiple bonds are aromatic containing up to 18 carbons and one hydroxyl group joined to a carbon possessing only single bonds, any substituent other than the hydroxy group being halogen, any halogen on non-aromatic carbon being fluorine, and (C) an organic ester of a monohydric alcohol of up to 18 carbons and in which any multiple bonds are aromatic with an acid of the group consisting of sulfuric and sulfonic acids, any substituent on said monohydric alcohol being halogen, any halogen on nonaromatic carbon being fluorine.

8. The process for the preparation of a ketal which comprises reacting together sym.-dichlorotetrafluoroacetone, a lower alkanol, and a lower alkyl sulfate in the presence of a strong inorganic base.

9. The process for the preparation of a ketal which comprises reacting together sym.-dichlorotetrafluoroacetone, methanol and dimethyl sulfate in the presence of a strong inorganic base.

10. The process for the preparation of a ketal which comprises reacting together sym.-dichlorotetrafluoroacetone, sec.-butanol and dimethyl sulfate in the presence of a strong inorganic base.

11. The process of claim 8 in which the alkanol is fluorinated.

References Cited in the file of this patent
UNITED STATES PATENTS

| | | |
|---|---|---|
| 2,522,566 | Chaney | Sept. 19, 1950 |
| 2,609,304 | Jones et al. | Sept. 2, 1952 |
| 2,611,787 | Holm | Sept. 23, 1952 |
| 2,681,370 | Husted et al. | June 15, 1954 |

OTHER REFERENCES

Fieser and Fieser: Organic Chemistry (1950), p. 138.
Cook: "Progress in Organic Chemistry," vol. 2, page 60, publ. by Academic Press, Inc., New York (1953).

UNITED STATES PATENT OFFICE

CERTIFICATE OF CORRECTION

Patent No. 2,901,514 August 25, 1959

John J. Drysdale

It is hereby certified that error appears in the printed specification of the above numbered patent requiring correction and that the said Letters Patent should read as corrected below.

Column 2, line 65, for "Cl, 2.9%." read -- Cl, 28.9%. --; column 9, line 22, for "hydroxy" read -- hydroxyl --.

Signed and sealed this 26th day of April 1960.

(SEAL)
Attest:

KARL H. AXLINE
Attesting Officer

ROBERT C. WATSON
Commissioner of Patents